United States Patent [19]

Wade et al.

[11] Patent Number: 5,444,117
[45] Date of Patent: Aug. 22, 1995

[54] COATING COMPOSITIONS CONTAINING POLYISOCYANATES AND ALDIMINES WHICH HAVE IMPROVED STORAGE STABILITY

[75] Inventors: Robert A. Wade, Carnegie, Pa.; Terrell D. Wayt, Moundsville, W. Va.

[73] Assignee: Bayer Corporation, Pittsburgh, Pa.

[21] Appl. No.: 193,978

[22] Filed: Feb. 9, 1994

[51] Int. Cl.$^6$ .................... C08G 18/00; C08K 5/16; C08K 3/00
[52] U.S. Cl. .................... 524/590; 524/593; 524/450; 524/791; 524/872; 524/874; 528/44; 528/64; 528/52
[58] Field of Search ............ 524/590, 593, 450, 791, 524/872, 874; 528/64, 44, 52

[56] References Cited

U.S. PATENT DOCUMENTS

| | | | |
|---|---|---|---|
| 3,420,800 | 1/1969 | Haggis | 260/75 |
| 3,567,692 | 3/1971 | Haggis | 260/75 |
| 4,251,428 | 2/1981 | Recker et al. | 524/450 |
| 5,087,661 | 2/1992 | Aoki et al. | 524/714 |
| 5,243,012 | 9/1993 | Wicks et al. | 528/58 |
| 5,290,902 | 3/1994 | Jacobs et al. | 528/49 |

FOREIGN PATENT DOCUMENTS 0223867 11/1985 Japan ................ 524/450

Primary Examiner—Paul R. Michl
Assistant Examiner—Olga Asinovsky
Attorney, Agent, or Firm—Joseph C. Gil; Thomas W. Roy

[57] ABSTRACT

The present invention relates to a coating composition having an improved pot life without a corresponding increase in dry time when cured under ambient conditions which contains
a) a polyisocyanate component,
b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent optionally substituted hydrocarbon radicals, or $R_1$ and $R_2$ together with the $\beta$-carbon atom form a cycloaliphatic or heterocyclic ring and
c) 0.1 to 15 weight percent, based on the total weight of the coating composition, of a water-adsorbing zeolite, wherein components a) and b) are present in an amount sufficient to provide an equivalent ratio of isocyanate groups to aldimine groups of 0.5:1 to 20:1.

18 Claims, No Drawings

COATING COMPOSITIONS CONTAINING POLYISOCYANATES AND ALDIMINES WHICH HAVE IMPROVED STORAGE STABILITY

BACKGROUND OF THE INVENTION

The present invention is directed to coating compositions based on polyisocyanates and aldimines which have improved pot lives without a corresponding increase in the dry times of the resulting coatings under ambient conditions.

Coating compositions which may be cured at room temperature are known. One-component coating compositions contain fully reacted polyurethanes as the binder. These compositions have the advantage that they are available as fully formulated systems which may be directly applied to suitable substrates without any preliminary steps except for mild stirring. Disadvantages of these systems are that large amounts of organic solvents are needed to reduce the viscosity of fully reacted, i.e., high molecular weight, polyurethanes. The coating compositions are cured by evaporation of the solvent which is objectionable from an environmental perspective. In addition, in order to solubilize the polyurethanes in organic solvents, they must be essentially linear polyurethanes. While such polyurethanes possess properties which are suitable for many applications, they do not provide certain properties, e.g., solvent resistance which may be obtained from crosslinked polyurethanes.

Two-component coating compositions are also known. These compositions come in two containers. The first contains a polyisocyanate, while the second contains an isocyanate-reactive component, generally a polyol. The components are not mixed until they are ready to be used. One advantage of these compositions is that because the components are not pre-reacted to form a high molecular weight polymer, a suitable processing viscosity can be achieved without the need for large amounts of organic solvents. In addition, higher functional components can be used to obtain highly crosslinked coatings which possess properties which surpass those possessed by one-component coatings.

The disadvantages of these compositions is that they cannot be applied without a preliminary mixing step in which it is critical that the components are mixed in the right proportions. In addition, special metering and mixing equipment is needed to conduct this process on a commercial scale. If the components are mixed in the wrong proportions, then the properties of the resulting coatings can be substantially affected. In addition, after the components are mixed they must be used in a timely fashion. If not, they continue to react until an unusable solid is obtained.

Coating compositions which possess the advantages of the known one- and two-component coating compositions without possessing their disadvantages have been disclosed in copending applications, U.S. Ser. Nos. 08/171,281 and 08/171,550. Even though coatings prepared in accordance with these copending applications possess many desirable properties, further improvements are needed in the pot lives of the compositions. In particular, the viscosity of these compositions increases too rapidly prior to being applied to a substrate and cured.

Accordingly, it is an object of the present invention to provide increased pot lives without significantly increasing the dry times of the resulting coatings and without altering any of the other desirable properties of the compositions.

This object may be achieved with the coating compositions of the present invention which contain polyisocyanates and aldimines and also the water-adsorbing zeolites described hereinafter to increase the pot life. It is surprising that an increase in the pot life can be obtained by incorporating these zeolites because contrary to the prior art, the Applicants have discovered that water does not hydrolyze aldimines to the corresponding amine.

In addition, in conventional pigmented, one-component, moisture-curing coating compositions containing polyisocyanates, water present in the pigments does affect the pot life. However, the pot life is still adequate, i.e., generally at least 12 to 24 hours, to provide sufficient time to apply the coating compositions before the viscosity increases to the point where it is not possible to apply the coating compositions using conventional spray equipment without adding additional solvent.

To the contrary the examples of the subject application demonstrate that pigmented coating compositions containing polyisocyanates and aldimines, which are essentially blocked amines, increase in viscosity much more rapidly. Since water does not hydrolyze the aldimines to form the corresponding amines (which would then rapidly react with the polyisocyanate component), there is no reason to expect that water is the cause of the more rapid increase in viscosity and shortened pot life. Accordingly, it is surprising that the addition of the water-adsorbing zeolites described hereinafter would have any affect on increasing the pot life of the systems.

For the preceding reasons, it would not be expected that the addition of zeolites would have any effect on increasing the pot life of the composition.

U.S. Pat. Nos. 3,420,800 and 3,567,692 disclose coating compositions containing polyisocyanates and either aldimines or ketimines. However, these patents do not teach the use of zeolites to increase the pot life. In addition, U.S. Pat. No. 5,243,012 teaches that tin compounds may be used to increase the pot life of coating compositions containing polyisocyanates and polyaspartic acid derivatives that contain secondary amino groups. Copending application, U.S. Ser. No. 08/171,304, teaches that tin compounds may be used to increase the pot life of coating compositions containing polyisocyanates and aldimines.

SUMMARY OF THE INVENTION

The present invention relates to a coating composition having an improved pot life without a corresponding increase in dry time when cured under ambient conditions which contains a) a polyisocyanate component,
b) an aldimine based on the reaction product of a polyamine having 2 or more primary amino groups with an aldehyde corresponding to the formula:

wherein $R_1$ and $R_2$ may be the same or different and represent optionally substituted hydrocarbon radicals, or $R_1$ and $R_2$ together with the β-carbon atom form a cycloaliphatic or heterocyclic ring and
c) 0.1 to 15 weight percent, based on the total weight of the coating composition, of a water-adsorbing zeolite, wherein components a) and b) are present in an amount sufficient to provide an equivalent ratio of isocyanate groups to aldimine groups of 0.5:1 to 20:1.

DETAILED DESCRIPTION OF THE INVENTION

Examples of suitable polyisocyanates which may be used as the polyisocyanate component in accordance with the present invention include monomeric diisocyanates, preferably NCO prepolymers and more preferably polyisocyanate adducts. Suitable monomeric diisocyanates may be represented by the formula

R(NCO)$_2$ in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3-and 1,4-bis-(isocyanatomethyl)-cyclohexane, bis-(4-isocyanato-3-methyl-cyclohexyl)-methane, α, α, α', α'-tetramethyl-1,3-and/or 1,4-xylyene diisocyanate, 1-isocyanato-l-methyl-4(3)-isocyanatomethyl cyclohexane, 2,4- and/or 2,6-hexahydrotoluylene diisocyanate, 1.3- and/or 1,4-phenylene diisocyanate, 2,4- and/or 2,6-toluylene diisocyanate, 2,4-and/or 4,4'-diphenylmethane diisocyanate, 1.5-diisocyanato naphthalene and mixtures thereof. Aromatic polyisocyanates containing 3 or more isocyanate groups such as 4,4',4''-triphenylmethane diisocyanate and polyphenyl polymethylene polyisocyanates obtained by phosgenating aniline/formaldehyde condensates may also be used.

In accordance with the present invention the polyisocyanate component is preferably in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanates adducts have an average functionality of 2 to 6 and an NCO content of 5 to 30% by weight.

1) Isocyanurate group-containing polyisocyanates which may be prepared as set forth in DE-PS 2,616,416, EP-OS 3,765, EPOS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480, herein incorporated by reference.

These NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. In accordance with the present invention NCO prepolymers also include NCO semi-prepolymers which contain unreacted starting polyisocyanates in addition to the urethane group-containing prepolymers.

As disclosed in copending application, U.S. Ser. No. 08/171,281, the compatibility between the polyisocyanates and the aldimines as well as the optical properties of the resulting coatings may be improved by the use of polyisocyanates containing a monoallophanate group, i.e., a polyisocyanate containing one allophanate group and formed from two isocyanate molecules and 1 monoalcohol molecule. In mixtures with monomeric polyisocyanates, polyisocyanate adducts or NCO prepolymers, the polyisocyanates containing allophanate groups should be present in an amount of at least 5% by weight, preferably at least 25% by weight and more preferably at least 40% by weight, based on the solids content of the polyisocyanate component.

Suitable aldimines for use in combination with the polyisocyanate mixtures include those prepared from an aldehyde and polyamines containing two or more, preferably 2 to 6 and more preferably 2 to 4, primary amino groups. The polyamines include high molecular weight amines having molecular weights of 400 to about 10,000, preferably 800 to about 6,000, and low molecular weight amines having molecular weights below 400. The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines starting compounds include tetramethylene diamine, ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 1,7-heptane diamine, 1,8-octane diamine, 1,9-nonane diamine, 1,10-decane diamine, 1,11-dodecane diamine, 1-amino-3-aminomethyl-3,5,5-trimethyl cyclohexane, bis-( 4-aminocyclohexyl)-methane, bis-(4-amino-3-methylcyclohexyl)-methane, 1,2- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bis-semicarbazides, phenylene diamine, 2,4- and 2,6-toluylene diamine, 2,3- and 3,4-toluylene diamine, polyphenylene polymethylene polyamines of the kind obtained by the aniline/formaldehyde condensation reaction, N,N,N-tris-(2-aminoethyl)-amine, guanidine, melamine, N-(2-aminoethyl)-1,3-propane diamine, 3,3'-diamino-benzidine, polyoxypropylene amines, polyoxyethylene amines, 2,4-bis-(4'-aminobenzyl)-aniline and mixtures thereof.

Preferred polyamines are 1-amino-3-aminomethyl-3,5,5-trimeethyl-cyclohexane (isophorone diamine or IPDA), bis-(4-aminocyclohexyl)-methane, bis-(4-amino-3-methylcyclohexyl)-methane, 1,6-diaminohexane, 2-methyl pentamethylene diamine and ethylene diamine.

Suitable high molecular weight polyamines correspond to the polyhydroxyl compounds used to prepare the NCO prepolymers with the exception that the terminal hydroxy groups are converted to amino groups, either by amination or by reacting the hydroxy groups with a diisocyanate and subsequently hydrolyzing the terminal isocyanate group to an amino group. Preferred high molecular weight polyamines are amine-terminated polyethers such as the Jeffamine resins available from Texaco.

Suitable aldehydes are those corresponding to the formula

$$O=CHCH(R_1)(R_2)$$

wherein
$R_1$ and $R_2$ may be the same or different and represent optionally substituted hydrocarbon radicals, preferably containing 1 to 10, more preferably 1 to 6, carbon atoms, or $R_1$ and $R_2$ together with the $\beta$-carbon atom form a cycloaliphatic or heterocyclic ring.

Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxyaldehyde.

The aldimines may be prepared in known manner by reacting the polyamines with the aldehydes either in stoichiometric amounts or with an excess of aldehyde. The excess aldehyde and the water which is produced can be removed by distillation. The reactions may also be carried out in solvents, other than ketones. The solvents may also be removed by distillation after completion of the reaction.

Suitable zeolites c) include those which are capable of adsorbing water, preferably those which adsorb water without adsorbing any of the other components of the coating composition. These preferred zeolites have a pore diameter of less than 10Å, preferably less than 5Å. Examples of suitable zeolites are sodium aluminosilicates and potassium sodium aluminosilicates, such as those available from Miles as Baylith T powder and Baylith L powder.

The zeolites are added to the coating compositions in an amount sufficient to adsorb 20 to 100%, preferably 60 to 100% and more preferably 100%, of the water present in the coating compositions. Excess amounts may be added, but do not provide any significant benefits. The amount of zeolite which is necessary can be calculated based on the water adsorption ability of the zeolite. For example, the preceding Baylith powders are capable of adsorbing about 25% of their weight in water.

Generally, the preceding guidelines can be achieved if zeolite c) is added in a minimum amount of at least 0.1 weight percent, preferably at least 0.5 weight percent and more preferably at least 1 weight percent, based on the total weight of the coating composition, up to a maximum amount of 15 weight percent, preferably 10 weight percent and more preferably 7 weight percent, based on the weight of the total weight of the coating composition.

The binders present in the coating compositions according to the invention contain polyisocyanate component a), aldimine component b) and zeolite c). While the coating compositions may also contain other isocyanate-reactive components, such as the polyols commonly used in polyurethane coating compositions, their presence is not preferred. Components a) and b) are used in amounts sufficient to provide an equivalent ratio of isocyanate groups to aldimine groups of 0.5:1 to 20:1, preferably 0.8:1 to 3:1 and more preferably 1:1 to 2:1.

The binders to be used according to the invention are prepared by mixing all of the individual components together or by premixing two of the components before adding the third component. For example, zeolite c) may be initially blended with the component a) or component b), preferably component b) before the addition of the other component.

Preparation of the binders is carried out solvent-free or in the presence of the solvents conventionally used in polyurethane or polyurea coatings. It is an advantage of the process according to the invention that the quantity of solvent used may be greatly reduced when compared with that required in conventional two-component systems.

Examples of suitable solvents include xylene, butyl acetate, methyl isobutyl ketone, methoxypropyl acetate, N-methyl pyrrolidone, Solvesso solvent, petroleum hydrocarbons and mixtures of such solvents.

In the coating compositions to be used for the process according to the invention, the ratio by weight of the total quantity of binder components a) and b) to the quantity of solvent is about 40:60 to 100:0, preferably about 60:40 to 100:0.

In addition to the binder components and component c), the coating compositions may also contain the known additives from coatings technology, such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators and extenders. Coating compositions containing pigments and/or fillers are especially suitable for the present invention due to the difficulty of removing all of the moisture from these additives.

It is also possible to incorporate other additives which increase the pot life of compositions containing polyisocyanates and aldimines, such as the tin compounds disclosed in copending application, U.S. Ser. No. 08/171,304, and in U.S. Pat. No. 5,243,012, the disclosures of which are herein incorporated by reference.

The additives are chosen based on the requirements of the particular application and their compatibility with components a) and b). The coating compositions may be applied to the substrate to be coated by conventional methods such as painting, rolling, pouring or spraying.

The coating compositions according to the invention have good storage stability and provide coatings which have relatively fast dry times. The coatings are also characterized by high hardness, elasticity, very good resistance to chemicals, high gloss, good weather resistance, good environmental etch resistance and good pigmenting qualities.

The invention is further illustrated, but is not intended to be limited by the following examples in which all parts and percentages are by weight unless otherwise specified.

EXAMPLES

The following starling materials were used in the examples:

Polyisocyanate 1

To a 500 ml 3-neck flask equipped with a gas bubbler, mechanical stirrer, thermometer and condenser was added 301.7 parts of hexamethylene diisocyanate and 13.3 parts of 1-butanol. The stirred mixture was heated for 1 hour at 60° C. while dry nitrogen was bubbled through the reaction mixture. The temperature of the reaction mixture was then raised to 90° C. To the reaction mixture at 90° C. was added 0.214 parts of a 4.4% solution of N,N,N-trimethyl-N-benzyl-ammonium hydroxide in 1-butanol. When the reaction mixture reached an NCO content of 34.8%, the reaction was stopped by adding 0.214 parts of di-(2-ethylhexyl)-phosphate. The excess monomer was removed by thin film evaporation to provide an almost colorless clear liquid having a viscosity of 630 mPa.s (25° C.), an NCO content of 19.7% and a free monomer (HDI) content of 0.35%. The yield was 48.6%.

Aldimine 1

The aldimine of bis-(4-aminocyclohexyl)-methane and isobutyraldehyde was prepared by initially charging 1514.3 parts (21 equivalents) of isobutyraldehyde and then slowly charging 2104.0 parts (20 equivalents) of bis-(4-aminocyclohexyl)-methane over a period of thirty minutes to avoid an exotherm. After the addition of the diamine the reaction mixture was stirred for one hour. At this time stirring was stopped and water was allowed to settle to the bottom of the reactor. As much water as possible was drained from the bottom of the reactor. The reaction mixture was then heated to 100° C. to remove excess isobutyraldeyde. While maintaining a temperature of 100° C., a vacuum of approximately 20 mm Hg was applied to remove any final traces of aldehyde. Thereafter the vacuum was increased to 1 mm Hg to remove water until the water content was less than 0.05% (approximately 1 to 3 hours.) The aldimine had a viscosity of 100 mPa.s at 25° C., an equivalent weight of 159.3, an APHA color of 70, a purity as determined by GPC of 93.5% and a water content of less than 0.05%.

Aldimine 2

The aldimine of 2-methyl pentamethylene diamine and isobutyraldehyde was prepared using the procedure described for aldimine 1.

Additive A - Dibutyltin dilaurate (T-12, available from Air Products)

Zeolite A - Baylith L powder, available from Miles)

Pigment A - titanium dioxide (Ti-Pure R-960, available from DuPont)

Pigment Dispersant A - Anti-Terra U, available from Byk Chemie

Polyol A - a polyesterether polyol (Desmophen 1150, available from Miles)

Example 1

Effect of Zeolite A on two-component, pigmented coating compositions based on Polyisocyanate 1 and Aldimine 1 or Polyol A Component 1 was prepared by adding pigment A, additive A and zeolite A powder to the amount of Aldimine 1 or Polyol A set forth in Table 1 and dispersed using a high speed cowles type disperser. Pigment A was added at an amount equal to a pigment to binder ratio of 0.5:1. Additive A was added in an amount of 0.30% based on the total weight of the coating composition. Zeolite A was added in an amount of 7%, based on the weight of Pigment A. The mixture was allowed to set overnight (minimum of 8 hours) at a temperature of 25° C. Then, the amount of polyisocyanate 1 set forth in Table 1, also at 25° C., was added to component 1 (NCO/NH equivalent ratio 1.1:1). The mixture was immediately poured into 8 oz. bottles and capped until needed for viscosity measurements on a Brookfield Viscometer. The results of the viscosity measurements are set forth in Table 2.

TABLE 1

|  | Formulations A–D | | | |
|---|---|---|---|---|
|  | A (Comp) | B | C (Comp) | D (Comp) |
| Component 1 | | | | |
| Aldimine 1 | 298.2 | 298.2 | — | — |
| Polyol A | — | — | 448.8 | 448.8 |
| Pigment A | 377.7 | 377.7 | 385.5 | 385.5 |
| Zeolite A | — | 26.4 | — | 27.0 |
| Additive A | 2.3 | 2.3 | 2.3 | 2.3 |
| Component 2 | | | | |
| Polyisocyanate 1 | 457.1 | 457.1 | 322.3 | 322.3 |

TABLE 2

| Viscosity (in mPa.s) | | | | |
|---|---|---|---|---|
|  | Formulations A–D | | | |
|  | A (Comp) | B | C (Comp) | D (Comp) |
| Initial | 3600 | 2600 | 3600 | 3900 |
| 15 Minutes | 2300 | 3300 | 4700 | 5300 |
| 50 Minutes | 2200 | 3900 | 22,000 | 11,000 |
| 1.5 hours | 2600 | 4200 | Gelled | Gelled |
| 2 hours | 2900 | 4200 | — | — |
| 3 hours | 3700 | 4200 | | |
| 8 hours | 9000 | 3300 | | |
| 23 hours | 30,000 | 4800 | | |

A comparison of formulation A with B demonstrates the improved pot life which may achieved in accordance with the present invention. However, a comparison of formulation C with D indicates that zeolites do not improve the pot lives of systems containing polyisocyanates and polyols in the same manner that they improve the pot lives of systems containing polyisocyanates and aldimines.

Example 2

Effect of Zeolite A on two-component, pigmented coating compositions based on Polyisocyanate 1 and Aldimine 1 or Aldimine 2

Component 1 was prepared by adding pigment A, pigment dispersant A and zeolite A to the amount of Aldimine 1 or Aldimine 2 set forth in Table 3 and dispersed using a high speed cowles type disperser. Pigment A was added at an amount equal to a pigment to binder ratio of 0.6:1. Zeolite A was added in an amount of 10%, based on the weight of Pigment A. The mixture was allowed to set overnight (minimum of 8 hours) at a temperature of 25° C. Then, the amount of polyisocyanate 1 set forth in Table 3, also at 25° C. was added to component 1 (NCO/NH equivalent ratio 1.05:1). The mixture was immediately poured into 8 oz. bottles and capped until needed for viscosity measurements on a Brookfield Viscometer. The results of the viscosity measurements are set forth in Table 4.

TABLE 3

|  | Formulations E–H | | | |
|---|---|---|---|---|
|  | E (Comp) | F | G (Comp) | H |
| Component 1 | | | | |
| Aldimine 1 | 300 | 300 | — | — |
| Aldimine 2 | — | — | 250 | 250 |
| Pigment A | 444 | 444 | 462 | 462 |
| Zeolite A | — | 44 | — | 46 |
| Pigment Dispersant A | 9 | 9 | 9 | 9 |
| Component 2 | | | | |
| Polyisocyanate 1 | 440 | 440 | 520 | 520 |

TABLE 4

| Viscosity (in mPa.s) | | | | |
|---|---|---|---|---|
|  | Formulations E–H | | | |
|  | E (Comp) | F | G (Comp) | H |
| Initial | 5200 | 3900 | 800 | 900 |
| 1 hour | 11,200 | 4600 | 1700 | 660 |
| 2 hours | gelled | 4200 | 2000 | 660 |
| 4 hours | — | 3500 | 2800 | 800 |
| 6 hours | — | 4200 | 3700 | 960 |
| 24 hours | — | 50,000 | 20,000 | 3280 |

A comparison of formulation E with F and formulation G with H demonstrates the improved pot life which may achieved in accordance with the present invention.

Example 3

Aldimine 1 and water in an equivalent ratio of 1:2 were dissolved in tetrahydrofuran and monitored by IR. After 6 days at ambient temperature, no evidence of aldimine hydrolysis was observed by IR. This result illustrates the hydrolytic stability of an aldimine.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which has an improved pot life without a corresponding increase in dry time when cured under ambient conditions comprising
    a) a polyisocyanate component,
    b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent optionally substituted hydrocarbon radicals, or $R_1$ and $R_2$ together with the β-carbon atom form a cycloaliphatic or heterocyclic ring and
    c) 0.1 to 15 weight percent, based on the total weight of the coating composition, of a water-adsorbing zeolite, wherein components a) and b) are present in an amount sufficient to provide an equivalent ratio of isocyanate groups to aldimine groups of 0.5:1 to 20:1.

2. The composition of claim 1 wherein said polyisocyanate is a polyisocyanate adduct.

3. The composition of claim 1 wherein said polyisocyanate is a polyisocyanate adduct containing monoisocyanurate and monoallophanate groups in a ratio of 10:1 to 1:10.

4. The composition of claim 1 wherein $R_1$ and $R_2$ are hydrocarbon radicals containing 1 to 6 carbon atoms.

5. The composition of claim 4 wherein said diamine comprises bis-(4-aminocyclohexyl)-methane.

6. The composition of claim 1 wherein said zeolite has an average pore diameter of less than 10Å.

7. A coating composition which has an improved pot life without a corresponding increase in dry time when cured under ambient conditions comprising
   a) a polyisocyanate component,
   b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent hydrocarbon radicals containing 1 to 6 carbon atoms and
   c) 0.5 to 10 weight percent, based on the total weight of the coating composition, of a water-adsorbing zeolite,
wherein components a) and b) are present in an amount sufficient to provide an equivalent ratio of isocyanate groups to aldimine groups of 0.5:1 to 20:1.

8. The composition of claim 7 wherein said polyisocyanate is a polyisocyanate adduct.

9. The composition of claim 7 wherein said polyisocyanate is a polyisocyanate adduct containing monoisocyanurate and monoallophanate groups in a ratio of 10:1 to 1:10.

10. The composition of claim 7 wherein $R_1$ and $R_2$ are hydrocarbon radicals containing 1 to 6 carbon atoms.

11. The composition of claim 10 wherein said diamine comprises bis-(4-aminocyclohexyl)-methane.

12. The composition of claim 7 wherein the proportions of components a) and b) are calculated to provide an equivalent ratio of isocyanate groups of component a) to isocyanate-reactive groups of component b) of about 0.8:1 to 3:1.

13. A coating composition which has an improved pot life without a corresponding increase in dry time when cured under ambient conditions comprising
    a) a polyisocyanate component,
    b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent optionally substituted hydrocarbon radicals, or $R_1$ and $R_2$ together with the $\beta$-carbon atom form a cycloaliphatic or heterocyclic ring and
    c) 0.5 to 10 weight percent, based on the total weight of the coating composition, of a water-adsorbing zeolite having an pore diameter of less than 10Å,
wherein components a) and b) are present in an amount sufficient to provide an equivalent ratio of isocyanate groups to aldimine groups of 0.8:1 to 3:1.

14. The composition of claim 13 wherein said polyisocyanate is a polyisocyanate adduct.

15. The composition of claim 13 wherein said polyisocyanate is a polyisocyanate adduct containing monoisocyanurate and monoallophanate groups in a ratio of 10:1 to 1:10.

16. The composition of claim 13 wherein said diamine comprises bis-(4-aminocyclohexyl)-methane.

17. The composition of claim 14 wherein said diamine comprises bis-(4-aminocyclohexyl)-methane.

18. The composition of claim 15 wherein said diamine comprises bis-(4-aminocyclohexyl)-methane.

* * * * *